United States Patent [19]

Pratesi

[11] Patent Number: 5,189,258
[45] Date of Patent: Feb. 23, 1993

[54] APPARATUS FOR DIRECTLY ATTACHING A STRAIN RELIEF CONNECTOR TO AN ELECTRICAL ENCLOSURE

[75] Inventor: Edward E. Pratesi, Middletown, Conn.

[73] Assignee: Bridgeport Fittings, Inc., Stratford, Conn.

[21] Appl. No.: 618,157

[22] Filed: Nov. 26, 1990

[51] Int. Cl.⁵ ............................................. H02G 3/22
[52] U.S. Cl. ................................. 174/65 R; 285/162
[58] Field of Search ............. 174/65 R, 151; 285/158, 285/162; 248/56

[56] References Cited

U.S. PATENT DOCUMENTS

| 4,012,578 | 3/1977 | Moran et al. | 174/65 R X |
| 4,626,620 | 12/1986 | Plyler | 285/162 X |
| 4,711,472 | 12/1987 | Schnell | 174/65 R X |
| 4,990,721 | 2/1991 | Sheehan | 174/65 R |

Primary Examiner—Leo P. Picard
Assistant Examiner—David Tone
Attorney, Agent, or Firm—McCormick, Paulding & Huber

[57] ABSTRACT

A novel retaining clip for use with strain relief connectors on electrical boxes that is capable of being attached to the threaded connector directly without threading has a series of spring clip tabs which engage an electrical box at an opening therein as the connector is displaced through the opening.

17 Claims, 2 Drawing Sheets

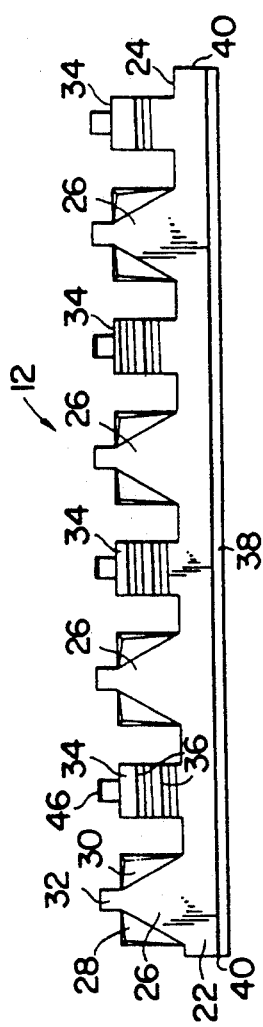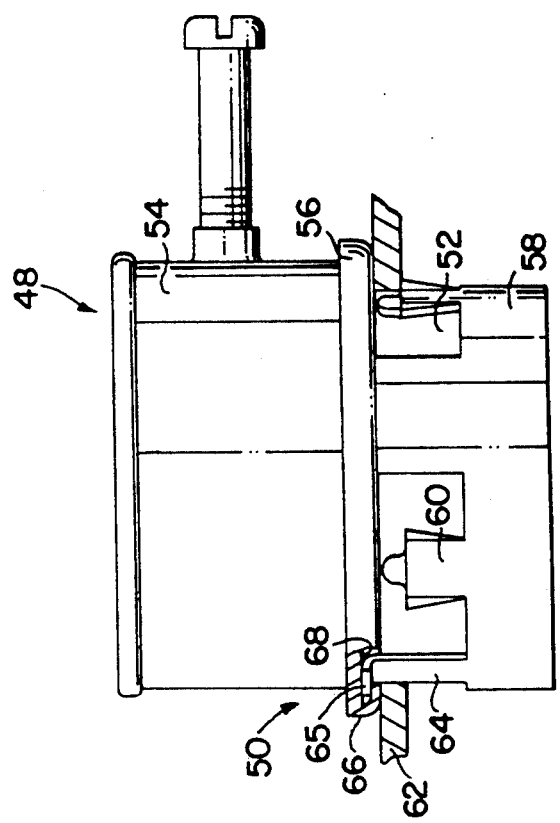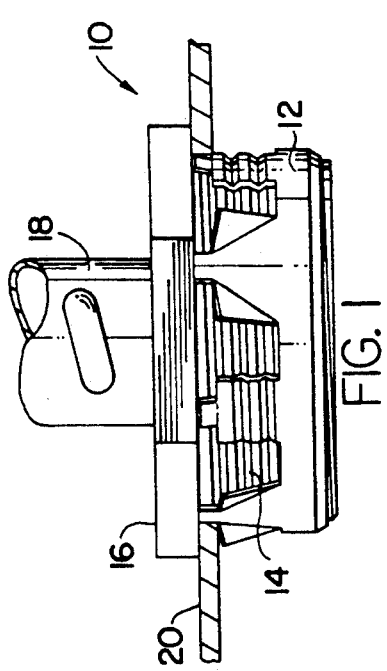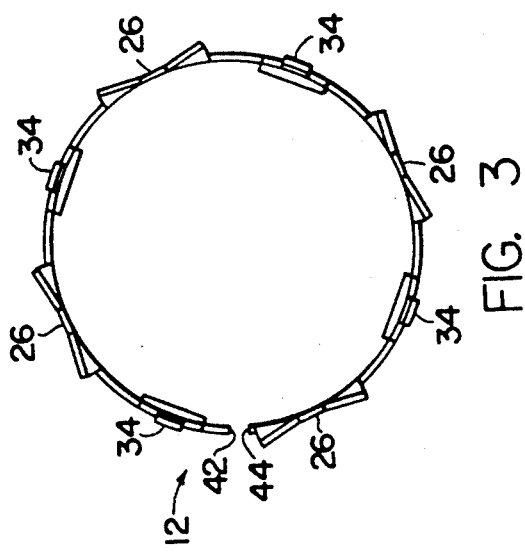

APPARATUS FOR DIRECTLY ATTACHING A STRAIN RELIEF CONNECTOR TO AN ELECTRICAL ENCLOSURE

TECHNICAL FIELD

This invention relates to an apparatus for quickly attaching a strain relief connector to an electrical box or enclosure and more particularly, for an apparatus which attaches to the connector without threading.

BACKGROUND OF THE INVENTION

Connectors for use with electrical boxes or enclosures are well known in the art. Electrical boxes, junction boxes, fuse boxes and other types of electrical enclosures are universally used in industrial and residential construction. As a result of their extensive use, these enclosures have dimensions which are of a standard magnitude. Electrical wire conduit, i.e. flexible (flex), rigid or intermediate hardness conduit as well as EMT (electric metallic tubing), MC and AC cable are all correspondingly produced with standardized dimensions. Typically, the conduit is joined to electrical boxes or other enclosures using a connector which is fixedly attached to the conduit and to an electrical box at an opening therein. A prime function of these connectors is to provide strain relief.

Known threaded connectors require a labor intensive two step process to assemble with a retaining ring. The connector comprises a body having an end threaded portion, a central flange and a second portion either collinear with the threaded portion or at an angle thereto which is adapted to receive a particular type of wire, conduit or cable. The threaded portion is received by the opening in the electrical box or enclosure. A threaded nut or ring is then screwed onto the threaded portion of the body drawing the flange up against the housing. The ring typically comprises a plurality of angled spaced tabs which extend from an outer peripheral surface of the ring. Tightening of the ring is accomplished by use of a screwdriver and hammer, with the angle of the tabs configured to make unintentional loosening difficult.

It would be advantageous to have a retaining apparatus for attaching threaded strain relief connectors to an electrical enclosure which would quickly connect directly to the threaded portion by a one step process and which would securely fasten the connector to the housing. The present invention is drawn towards such an element.

SUMMARY OF THE INVENTION

An object of the present invention is to provide a retaining apparatus for a strain relief type or connector that is capable of affixing the connector to the housing without being threaded thereon. It is intended to fit all trade size fittings ½" to 4"rigid steel conduit, EMT, flexible metal conduit, AC and MC connectors.

Another object of the present invention is to provide for a strain relief connector assembly which will snap engage to a housing at an opening therein.

Still another object of the present invention is to provide a retaining apparatus of the foregoing type which can be assembled with a connector either before or after the connector is inserted into the housing.

According to the present invention a retaining apparatus for quickly connecting a body having a flange and a threaded portion to a housing through an opening therein includes a first member having a thread engaging means for fastening the element without threading to the body to form an assembly therewith. Also included in an asymmetric clasping means configured with the element first member for fastening the assembly to the housing. The asymmetric clasping means is capable of slidably engaging the housing at the opening only when moved relative thereto in a first direction.

BRIEF DESCRIPTION OF THE DRAWINGS

FIG. 1 is an illustration of a standard strain relief type connector receiving a retaining apparatus as provided by the present invention.

FIG. 2 is an illustration of the retaining apparatus of FIG. 1 in planar form.

FIG. 3 is a top view of the retaining apparatus of FIG. 1 finally configured in a circular form.

FIG. 4 is an illustration of a strain relief connector having a first alternative retaining system provided according to the present invention.

DESCRIPTION OF THE PREFERRED EMBODIMENT

Figure 6:
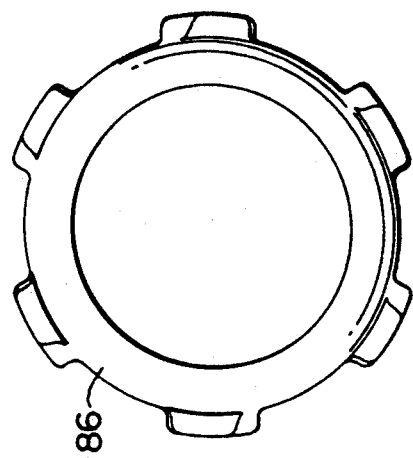
FIG. 6 is a planar view of a prior art retaining ring.

Referring now to FIG. 1 there is illustrated a portion of a strain relief type connector 10 which receives a retaining apparatus in the form of a retaining clip 12 provided according to the present invention. As detailed hereinabove, a typical electrical strain relief connector comprises a threaded first portion 14 which terminates at a flange 16 and further comprises a second portion 18 which is adapted to receive a section of conduit which can be, for example, rigid or intermediate conduit. Alternatively, the second portion can be adapted to receive a cable or wire. These connectors are of a standard size and the threads on the threaded first portion are also standardized at a selected thread pitch. These known strain relief connectors include ½" angle connectors, 90°⅜" dc connectors and ⅜" duplex connectors with an insulated throat.

The connector 10 is received in an electrical box or enclosure 20 of a type known in the art which has a plurality of openings therein. The thickness of the box and the dimensions of the openings are standardized. The electrical boxes receive the electrical wires contained by the conduit and are connected to switches, outlets or the like.

The connector 10 has been designed to receive a threaded retaining ring 86 of the prior art (FIG. 6) which comprises an inner threaded portion and a plurality of tabs which extend out from an outer peripheral surface. To fasten the strain relief connector to the box, the threaded portion is inserted through the opening in the electrical box 20 and the retaining ring is screwed thereon drawing the flange to the box. The retaining ring is secured either by the use of a wrench or, more typically, by tapping with a screwdriver on the tabs to rotate the ring and engage the inner surface of the junction box.

As noted above, the labor necessary to affix the conduit to the strain relief connector and hence to the electrical box is complex and lengthy, and requires hand tools to accomplish. However, the labor associated with affixing the present retaining clip detailed hereinbelow is greatly reduced since the affixation process (1) does not require threading, (2) does not require additional tools to assemble with the strain relief connector and (3) can be either directly connected to a conduit end and thereafter snap engaged to the box or snap engaged to the box and then connected to the conduit.

FIG. 2 illustrates the retaining clip of FIG. 1 before it is configured to encompass the threaded portion 14 of the strain relief conductor 10. The clip 12 is preferably formed from a stamped sheet of annealed steel, type No. 1074 or equivalent, and has a main portion 22 having a peripheral edge 24. From the main portion extends a plurality of asymmetric clamping tabs or spring tabs 26. These tabs as shown in FIGS. 2, 3 are formed to have first 28 and second 30 outer tab sections around a central section 32 such that when the clip is formed to encompass the threaded connector, the outer sections are outwardly displaced relative to the inwardly facing central portion.

The clip also comprises a series of engagement tabs 34, which are spaced along the peripheral edge 24 alternating with the clamping tabs 26. The tabs 34 are characterized by grooves 36 formed in each of the tabs which taken together with thread 38 and formed edges 40 in the main portion are configured to approximately receive the threaded portion of the connector. The clip is rolled to a diameter approximately encompassing the threaded mechanism portion such that edges 42 and 44 of the clip oppose each other with a small gap therebetween. In the preferred embodiment, the engagement tabs further comprise a outermost peripheral edge 46, to more securely contact a connector flange surface. The peripheral edge or end 46 may be knurled. Although it is possible to have a taper in width across the length of the clip, it should be noted that such a taper can preferably be eliminated with a corresponding saving in production cost of between 20 and 25%. Total costs of stamping and forming the clip 12 are in the range of 1-2 cents.

As noted above, the clip may either be first installed on the strain relief connector or on the electrical box. In either case, the clip is pressed onto the threaded mechanism portion. Since the clip has a somewhat variable diameter, it slides easily over the threads towards the flange. To affix the clip to the strain relief mechanism, the clip is rotated into the flange. The threads formed in the clip are configured to cross thread with the corresponding threads of the threaded mechanism portion.

The connector and clip form an assembly which can then be inserted directly into an opening in the electrical box. The spring tabs are flexibly displaced down and in as the tab enters the opening and move outward to engage the interior box surface when the peripheral edges of the tab outer sections are moved past the inner surface of the junction box. Exemplary dimensions for the clip are 0.8 inch in diameter with a 0.03 inch gap between the clip ends when formed. The center tab section 32 extends above the first and second outer tab sections approximately 0.060 inches, with the first and second outer tab sections having a total extent of 0.180 inches from the main portion that is 0.125 inches in width. The first and second outer tabs are inwardly bent from the clip circumference about 0.035 inches. The engagement tabs are approximately 0.150 inches wide and extend 0.240 inches from the main portion.

Those skilled in the art will note that the present invention also can be adapted for use with strain relief connectors not having a threaded portion. Referring now to FIG. 4, there is illustrated a side view of a strain relief assembly 48 that comprises a strain relief connector 50 configured to have first and second portions 52 and 54 separated by a flange 56. The connector is formed in a known manner, such as by die casting without threads but with the first portion adapted to receive a clip 58. The clip 58 is characterized by a plurality of asymmetric spring tabs 60 similar to those described hereinabove with respect to FIGS. 1-3 for engaging box wall 62. The clip 58 is characterized by a plurality of locking tabs 64 alternately spaced along a peripheral surface of the clip which have a protruding portion 65 configured to engage a cooperative flange portion 66. The spring tabs are displaced relative to the flange portion as the clip 58 is moved towards the flange until it passes an inner surface 68 of the flange portion and is captured thereby.

Figure 5:
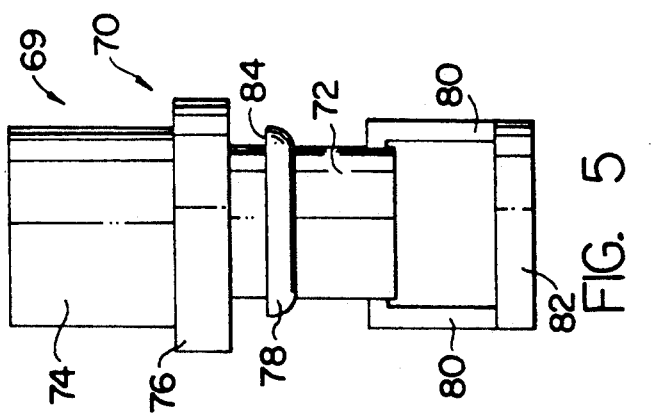
FIG. 5 is an illustration of a second alternative retaining system to that of FIG. 1.

FIG. 5 illustrates an alternative assembly 69 to that of FIG. 4. In the assembly 69 of FIG. 5, connector 70 comprises first and second portions 72, 74 and flange 76. The first portion 72 is formed without threads, and is characterized by a circumferential member 78 extending from the outer surface of the first portion and shaped to receive spring engagement tabs 80 formed as part of clip 82 of which only a portion is shown. The clip comprises asymmetrical spring tabs (not shown) for engaging an electrical box at an opening therein similar to those of the clip of FIG. 1. The assembly 69 is formed by sliding the clip on the connector first portion until it is displaced past the member 78 and engagement tabs 80 are captured along flange surface 84.

Although shown to comprise two elements, those skilled in the art will note that the present invention encompasses a strain relief connector formed with the clip integral therewith such that the spring tabs or other asymmetric clasping mechanism extend out from the first portion. Similarly, although the invention has been shown and described with respect to a preferred embodiment thereof, it should be understood by those skilled in the art that various other changes, omissions and additions thereto may be made therein without departing from the spirit and scope of the present invention.

I claim:

1. A retaining apparatus for quickly connecting a body having a flange with a threaded portion to a housing through an opening therein, said retaining apparatus comprising:
   a member having a thread engaging means that includes a plurality of thread engaging tabs spaced about said member to extend from a member major edge for fastening the apparatus without threading to the body threaded portion to form an assembly therewith; and
   a fastening means extending from said member major edge that is capable of slidably engaging said housing only when moved a selected amount through said opening in a first direction and fastening said assembly to the housing when a force is applied which tends to move said assembly in the opposite direction.

2. The apparatus of claim 1 wherein said member engaging tabs are configured with a knurled end for engaging said flange.

3. The apparatus of claim 1 wherein said member thread engaging means further comprises a means for allowing movement thereof along said body threaded portion before fixedly engaging the flange.

4. The apparatus of claim 3 wherein said member further comprises first and second ends and is configured to substantially encompass said body threaded portion with said first end displaceable from said second end.

5. The apparatus of claim 1 wherein said member thread engaging means further comprises a means for engaging said body portion threads in a cross threaded manner.

6. The apparatus of claim 1 wherein
said member is configured from a sheet piece having a plurality of engagement tabs spaced along a first major edge thereof from a piece first end to a piece second end, said first member is further configured to encompass the body threaded portion with said piece ends displaceable from one another,
said thread engaging means comprises a plurality of threads formed in said piece and said engagement tabs, and
said fastening means comprises a plurality of clamping tabs alternately spaced with said engaging means tabs along said piece first major edge.

7. The apparatus of claim 6 wherein said clamping tabs extend from said sheet piece first major edge and further comprise a central tab section and first and second outer tab sections, said first and second outer tab sections being configured at an angle with respect to a plane containing the sheet piece.

8. A mechanism for receiving electrical wire carrying conduit at an interior cavity thereof to be secured to an opening in a housing, said mechanism comprising:
a first member to be received by the housing opening and having a first snap engagement means formed in flange whose outer circumference exceeds a diameter of said housing opening, said flange having a recess partially bounded by an inwardly extending land having an inner surface; and
a second member having an fastening means capable of slidably engaging said housing only when moved a selected amount through said housing opening in a first direction and capable of fastening said second member to the housing when a force is applied which tends to move said second member in the opposite direction, said second member also including a second snap engagement means that has an inwardly displaceable element having an outwardly extending tab for being received in said flange recess at said first member flange land inner surface, thereby affixing said first and second members to said housing.

9. The receiving mechanism of claim 8 further comprising of means for fixedly locating said conduit in the mechanism and wherein said first and second members include a central opening adapted to receive electrical wire carrying conduit.

10. The mechanism of claim 8 wherein said asymmetric fastening means further comprises a tab means adapted to be outwardly displaced relative to said first snap engagement means.

11. A mechanism for receiving electrical wire carrying conduit at an interior cavity thereof to be secured to an opening in a housing, said mechanism comprising:
a first member to be received by the housing opening and having a first snap engagement means formed in a flange whose outer circumferential surface is less than a circumference of said housing opening, and
a second member having a fastening means capable of slidably engaging said housing only when moved a selected amount through said housing opening in a first direction and capable of fastening said second member to the housing when a force is applied which tends to move said second member in the opposite direction, said second member also including a second snap engagement means that has an outwardly displaceable element having an inwardly extending tab adapted to be received by a land surface of said flange, thereby affixing said first and second members to said housing.

12. A mechanism for receiving electrical wire carrying conduit at an interior cavity thereof to be secured to an opening in a housing, said mechanism comprising:
a first member adapted to be received by the housing opening at a first member land having an extent greater than said housing opening, said first member having a narrow portion extending longitudinally from said first member land and further having a flange that extends outward from a narrow portion outer surface an amount less than a diameter of said housing opening with a flange land facing said first member land, and
a second member configured to substantially encompass said first member narrow portion and having first and second ends displaceable from one another, said second member capable of slidably engaging said first member outer surface only when moved along said narrow portion outer surface a selected amount and capable of fastening said first and second members to the housing when said second member is moved over and beyond said flange such that said second member abuts said flange land.

13. A retaining apparatus that quickly connects to a housing opening, said retaining apparatus comprising:
a body having a first flange for engaging said housing about said housing opening, said body having a longitudinally extending narrow portion having a second flange extending outward from a narrow portion outer surface with a circumference less than a housing opening diameter;
a member having a second flange engaging means adapted to be received along said body narrow portion outer surface to form an assembly therewith; and
a fastening means capable of slidably engaging said housing only when moved a selected amount through said housing opening in a first direction and fastening said assembly to the housing when a force is applied which tends to move said assembly in the opposite direction.

14. The retaining apparatus of claim 13 wherein said second flange further comprises a land facing said body first flange.

15. The retaining apparatus of claim 13 wherein said flange engaging means further comprises a plurality of flange engagement tabs spaced about said member to extend from a first member major edge.

16. The retaining apparatus of claim 13 wherein said fastening means comprises a plurality of clamping tabs spaced about said member to extend from a member major edge.

17. The retaining apparatus of claim 13 wherein said member is configured from a sheet piece having a plurality of flange engagement tabs spaced along a first major edge thereof from a sheet piece first end to a sheet piece second end, said first member is further configured to encompass the body narrow portion with said piece ends displaceable from one another.

* * * * *